(12) United States Patent
Liu

(10) Patent No.: US 6,854,718 B1
(45) Date of Patent: Feb. 15, 2005

(54) VAPORIZER

(75) Inventor: You-Chun Liu, Tainan (TW)

(73) Assignee: Hwang Sun Enterprise Co., Ltd., Tainan (TW)

( * ) Notice: Subject to any disclaimer, the term of this patent is extended or adjusted under 35 U.S.C. 154(b) by 0 days.

(21) Appl. No.: 10/356,182

(22) Filed: Jan. 30, 2003

(51) Int. Cl.[7] .................................................. B01F 3/04
(52) U.S. Cl. ................................ 261/81; 261/DIG. 48; 261/DIG. 65
(58) Field of Search ........................ 261/81, 1, DIG. 48, 261/DIG. 65

(56) References Cited

U.S. PATENT DOCUMENTS

| | | | | |
|---|---|---|---|---|
| 3,387,607 A | * | 6/1968 | Gauthier et al. | ........ 128/200.16 |
| 3,490,697 A | * | 1/1970 | Best, Jr. | ................... 239/102.2 |
| 3,561,444 A | * | 2/1971 | Boucher | ................ 128/200.16 |
| 3,690,317 A | * | 9/1972 | Millman | ................ 128/200.16 |
| 4,031,171 A | * | 6/1977 | Asao et al. | ...................... 261/1 |
| 4,479,609 A | * | 10/1984 | Maeda et al. | ............. 239/102.2 |
| 4,641,053 A | * | 2/1987 | Takeda | ......................... 310/317 |
| 4,746,466 A | * | 5/1988 | Takahashi | ..................... 261/30 |
| 5,176,856 A | * | 1/1993 | Takahashi et al. | ........... 261/142 |
| 5,217,165 A | * | 6/1993 | Takahashi et al. | ........ 239/102.2 |
| 5,261,601 A | * | 11/1993 | Ross et al. | ................ 239/102.2 |
| 5,435,282 A | * | 7/1995 | Haber et al. | ........... 128/200.16 |
| 5,836,515 A | * | 11/1998 | Fonzes et al. | ............ 239/102.2 |

FOREIGN PATENT DOCUMENTS

JP 52-53514 * 4/1977 ................... 261/81

* cited by examiner

Primary Examiner—Richard L. Chiesa
(74) Attorney, Agent, or Firm—Pro-Techtor International Services

(57) ABSTRACT

A vaporizer includes a case covered with a cover, and a vibrator. The case is divided into a liquid room and an air room. The liquid room has a protruding round member formed in the bottom, and the protruding round room has a center hole for receiving the vibrator from under. The vibrator is connected to a logic circuit and a drive circuit, including an alloy member, a conductive disc, a spring pushing against the conductive disc, an insulating sleeve receiving the spring, a metallic base receiving the insulating sleeve and having heat releasing leaves, then the vibrator receives high frequency vibration signals to produce high frequency vibration for dissolving water into water molecules to flow out of an air outlet of the cover by an exhausting fan in the air room. Thus the vaporizer makes vapor.

5 Claims, 4 Drawing Sheets

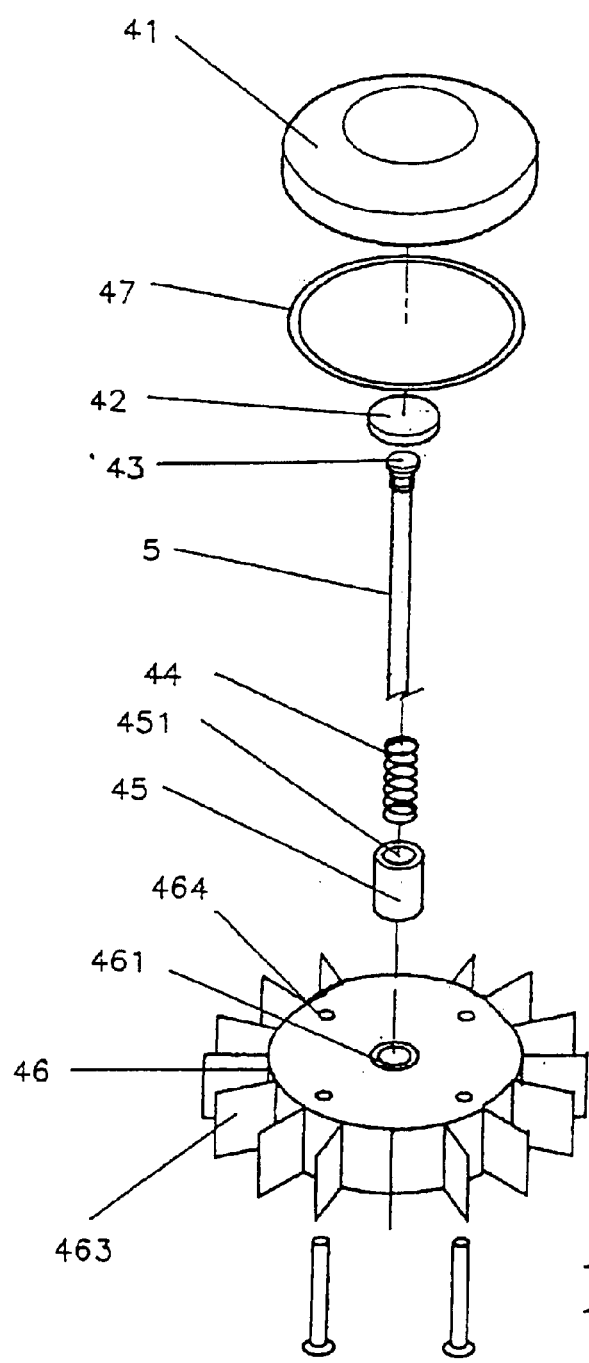

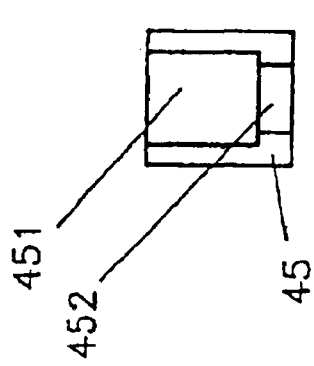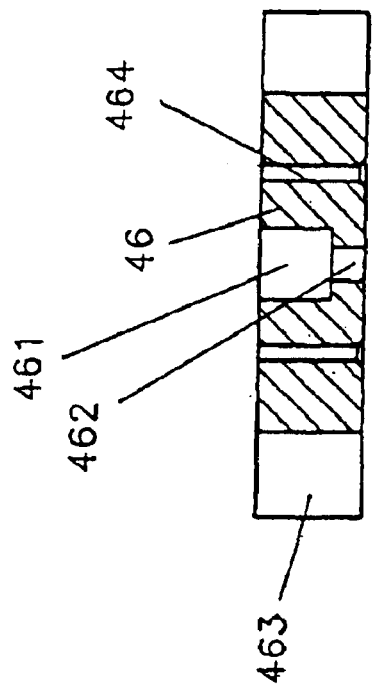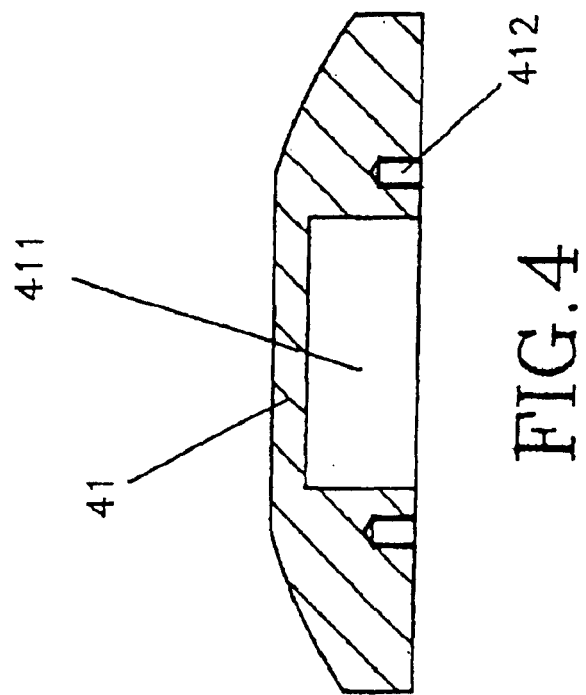

VAPORIZER

BACKGROUND OF THE INVENTION

This invention relates to a vaporizer, particularly to one having a vibrating member closely contacting a conductive disc elastically pushed by a spring for completely effecting high frequency vibration, and a guide net guiding liquid to immerse on an upper surface of an alloy member in the vibrating member for maintaining a thin layer of liquid thereon so that high frequency vibration is carried on continuously to dissolve water molecule to produce vapor. The alloy member is heated up by the heat produced by high frequency vibration, and then its heat is dissipated by a plurality of heat releasing leaves of a base of the vibrator, keeping the heat at a certain level.

Vaporizers are widely used, and a conventional vaporizer shown in FIG. 7 includes a water tray 7 with a center hole 71, and a vibrator 72 fitted in the center hole 71. The vibrator 72 consists of a ceramic member 73, an upper silver layer 74, a lower silver layer 75 on the ceramic member 73, a fixing member 76 and a signal wire 77. The upper and the lower silver layer 74 and 75 are connected to a logic circuit and a drive circuit (not shown in Figure) by means of the signal wire 77, receiving high frequency vibrating signals to produce high frequency vibrations. Then the ceramic member 73 is fixed in the fixing member 76, which is then adhered on the bottom of the water plate 7 around the center hole 71. This kind of structure may easily cause leaking by high frequency vibration for a long period of time. Moreover, the upper silver layer 74 directly contacts with water, negative pressure may occur owing to air explosion induced by water vaporizing produced by high frequency vibration. Then the silver layer may peel off or split to lose its function. As the vibrator 72 has to be placed in water 3 cm to 10 cm deep, so if the water level is too low to let the vibrator expose out of the water, there is no water to be vaporized, with heat rising up and impossible to dissipate to result in burning of the whole vaporizer.

SUMMARY OF THE INVENTION

This invention has been devised to offer a vaporizer effectively producing high frequency vibration for vaporizing water, dissipating heat, preventing water leak, and having a long service life.

The feature of the invention is a vibrator connected to a logic and a drive circuit for receiving high frequency vibration signals to produce high frequency vibration for vaporizing the water stored in a liquid room provided in a case, and a guide net having function of water absorbing and laid on the upper surface of the vibrator and a protruding round member in the liquid room. The vibrator consists of an alloy member with a piezoelectricity ceramic coated with an upper silver layer and a lower silver layer, a conductive disc connected to a lead wire, an insulating sleeve, a spring fitted in the insulating sleeve for pushing against the conductive disc, a base receiving the insulating sleeve and having heat releasing leaves, and a water blocking ring between the alloy member and the base.

BRIEF DESCRIPTION OF DRAWINGS

This invention will be better understood by referring to the accompanying drawings, wherein:

FIG. 2 is a side cross-sectional view of a guide net in the present invention;

FIG. 3 is an exploded perspective view of a vibrator in the present invention;

FIG. 4 is a cross-sectional view of a cap for the vibrator in the present invention;

FIG. 5 is a cross-sectional view of an insulating cylindrical sleeve of the vibrator in the present invention;

FIG. 6 is a cross-sectional view of a base of the vibrator in the present invention; and, FIG. 7 is a cross-sectional view of a conventional vaporizer.

DETAILED DESCRIPTION OF THE PREFERRED EMBODIMENT

Figure 1:
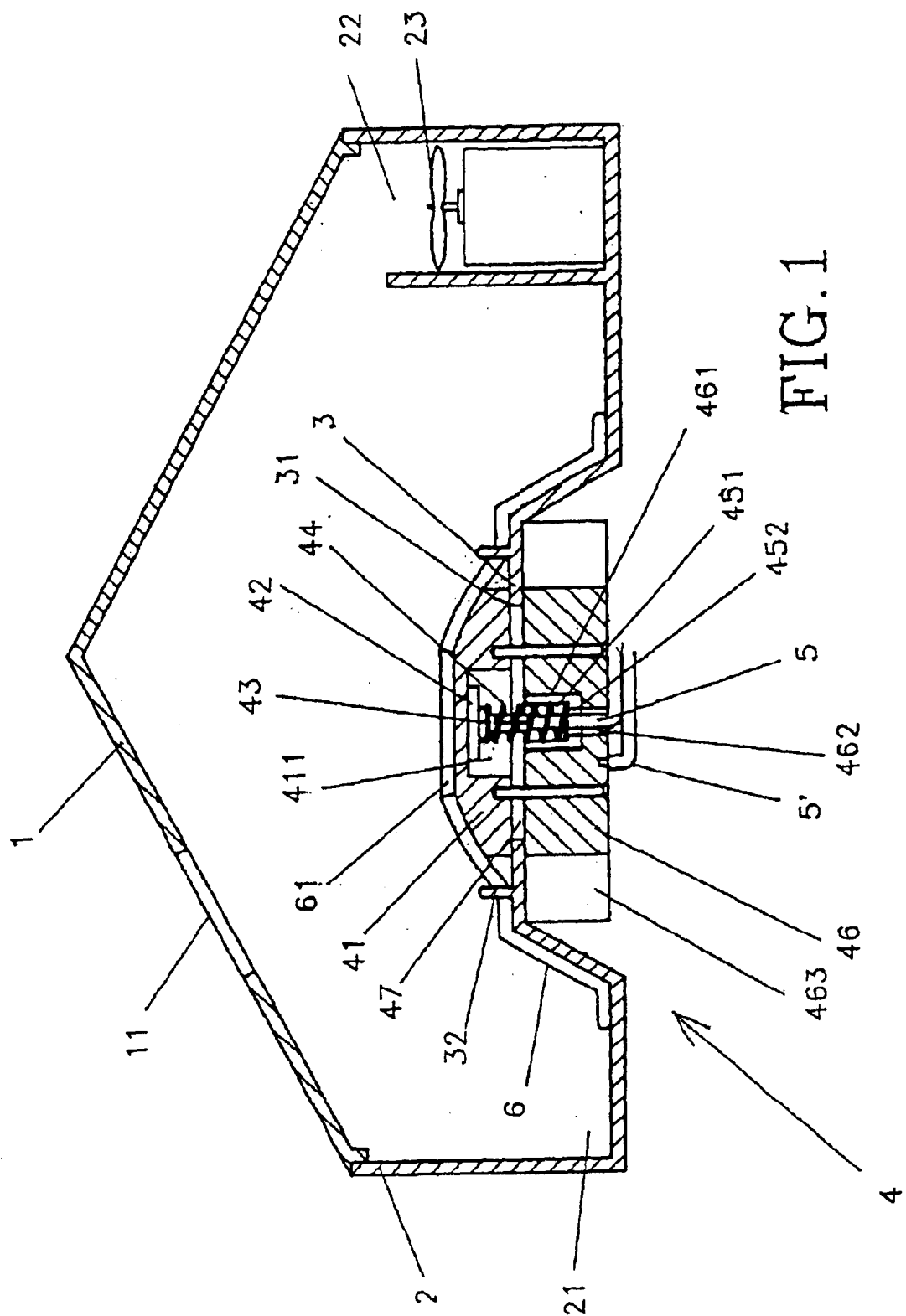
FIG. 1 is a side cross-sectional view of a vaporizer in the present invention.
Figure 7:
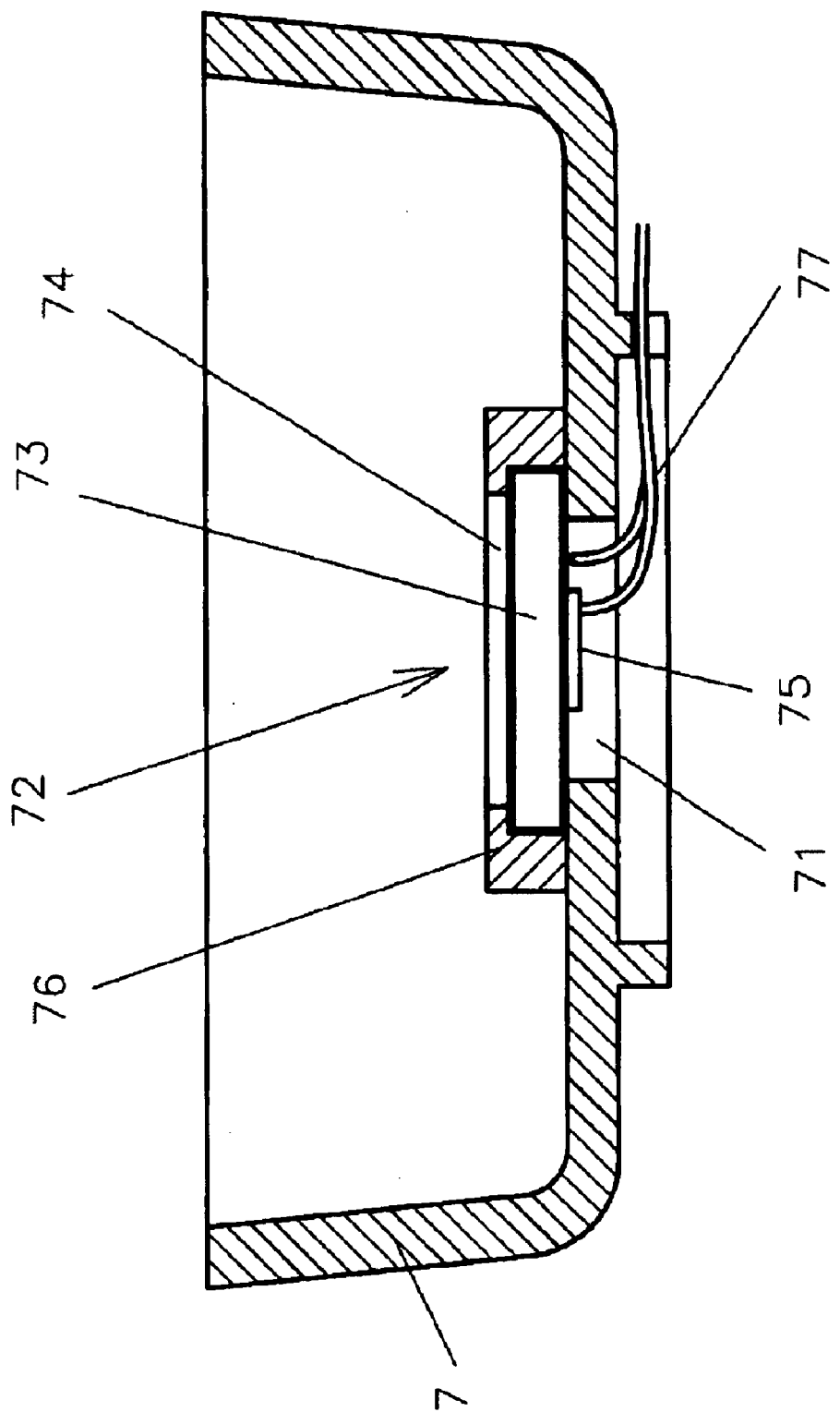

A preferred embodiment of a vaporizer in the present invention, as shown in FIG. 1, includes a cover 1 with an air outlet 11, a case 2 with an open upper side covered by the cover 1, a liquid room 21 and a air room 22 formed in the case 2, an exhausting fan 23 provided in the air room 22, a vibrator 4, and a guide net 6.

The exhausting fan 23 sucks air outside the case 2 into the case 2 and then flows out of the air outlet 11 of the cover 1.

A projecting round member 3 is formed in the center of the bottom of the liquid room 21, having a center hole 31 for placing the vibrator 4 therein, and a plurality of position posts 32 spaced apart on an upper flat surface for position holes 62 of a guide net 6 to fit with for stabilizing the guide net 6 on the projecting round member 3.

The vibrator 4 is connected to a logic circuit and a drive circuit (not shown in Figures) with lead wires 5, 5', receiving high frequency signals and then producing vibrations.

The guide net 6 is made of a net or a cloth, having a center hole 61 and function of absorbing water, with the center hole 61 placed on an upper surface of the vibrator 4, and the position holes 62 spaced apart around the center hole 61. The guide net 6 absorbs liquid in the liquid room 21 continuously to supply it to the tipper surface of the vibrator 4 to always maintain a thin layer of the liquid thereon. Then the vibrator 4 dissolves the liquid into water molecules with high frequency vibration, and the air current formed in the air room 22 carries the water molecules and flows out of the air outlet 11 of the cover 1 as vapor.

Next, referring to FIGS. 3 to 6, the vibrator 4 consists of an alloy member 41, ceramic member 42, a conductive disc 43, a spring 44, an insulating sleeve 46, and a water blocking ring 47. The alloy member 41 has the thickness being 1.7–6 mm and a chamber 411 formed in the bottom center for receiving the ceramic member 42 therein from under. The ceramic member 42 has an upper silver layer and a lower silver layer. The conductive disc 43 is connected with an upper end of a lead wire 5 and pushing the lower surface of the ceramic member 42. The spring 44 pushes against the conductive disc 43 and fits around a lead wire 5, and the insulating sleeve 45 has a center hole 451 for receiving the spring 44 therein and fits in the base 46. The insulating sleeve 45 also has a smaller hole 452 formed in a lower end for the lead wire 5 to pass through. The metallic base 46 has a center hole 461 for the insulating sleeve 45 to fit therein, having a plurality of heat releasing leaves 463 spaced apart vertically and radially around an outer circumference, and a smaller hole 462 in a lower portion for the lead wire 5 to extend through. A plurality of threaded holes 464 are also provided in the base 46 facing the threaded holes 413 of the alloy member 41. Another lead wire 5' is additionally connected to the lower end of the base 46. Moreover, the water-blocking ring 47 is provided between the center hole 31 of the protruding round member 3 and the base 46, adhered on the alloy member 41 with adhesive. Then the alloy member 41 and the base 46 are tightly screwed together with bolts screwing through the threaded holes 413 and 464, sandwiching firmly the protruding round member 3 around the center hole 31.

In general, the vaporizer in the present invention uses the spring 44 pushing the conductive disc 43 against the ceramic member 42 contacting with the alloy member 41, and the guide net 6 for absorbing water maintaining a thin layer of water on the upper surface of the alloy member 41, and the heat releasing leaves 463 of the base 46 for dissipating the heat accumulated on the base 46, for effectively transmitting high frequency vibration, vaporizing, heat dissipating and holding water without leaking.

While the preferred embodiment of the invention has been described above, it will be recognized and understood that various modifications may be made therein and the appended claims are intended to cover all such modifications that may fall within the spirit and scope of the invention.

I claim:

1. A vaporizer comprising:

a case with an open upper side covered with a cover, said case being divided into a liquid compartment and an air compartment;

a vibrator electrically connected to a logic circuit and a drive circuit for receiving high frequency vibrating signals and producing high frequency vibration so as to dissolve liquid stored in said liquid compartment into water molecules;

said air compartment having an exhausting fan for exhausting air therein out of an air outlet provided in said cover;

said liquid compartment having a protruding round member formed in a bottom of said case, said protruding round member having a center hole and a plurality of position posts spaced apart on an upper flat surface;

said vibrator positioned in said center hole of said protruding round member; and, a guide net having a center hole, covering an upper flat surface of said vibrator, said protruding round member and said liquid compartment.

2. The vaporizer as claimed in claim 1, wherein said guide net is a net body.

3. The vaporizer as claimed in claim 1, wherein said guide net is a cloth body.

4. The vaporizer as claimed in claim 1, wherein said vibrator comprises;

an alloy member having a ceramic member placed therein;

a conductive disc connected to a lead wire;

a spring pushing against said conductive disc and fitting around said lead wire;

an insulating sleeve receiving said spring therein;

a metallic base receiving said insulating sleeve and a plurality of heat releasing leaves vertically and radially fixed on its circumference and a hole for another lead wire to pass through;

a water-blocking ring placed between said alloy member protruding round member around said center hole.

5. The vaporizer as claimed in claim 4, wherein said alloy member has a thickness of 1.7–6 mm.

* * * * *